United States Patent
Shim et al.

(10) Patent No.: US 8,164,580 B2
(45) Date of Patent: Apr. 24, 2012

(54) INPUT APPARATUS AND METHOD USING OPTICAL MASKING

(75) Inventors: Jung-hyun Shim, Seongnam-si (KR);
Dong-kyung Nam, Yongin-si (KR);
Chang-su Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 906 days.

(21) Appl. No.: 11/797,758

(22) Filed: May 7, 2007

(65) Prior Publication Data

US 2007/0294638 A1 Dec. 20, 2007

(30) Foreign Application Priority Data

Jun. 19, 2006 (KR) ........................ 10-2006-0055028

(51) Int. Cl.
*G06F 3/042* (2006.01)

(52) U.S. Cl. ........ 345/175; 715/821; 715/822; 715/823; 715/824; 715/825

(58) Field of Classification Search .................. 345/170; 715/821–825
See application file for complete search history.

(56) References Cited

U.S. PATENT DOCUMENTS

| | | | | |
|---|---|---|---|---|
| 4,880,969 A | * | 11/1989 | Lawrie | 250/221 |
| 6,552,713 B1 | * | 4/2003 | Van Brocklin et al. | 345/157 |
| 6,993,362 B1 | * | 1/2006 | Aberg | 455/566 |
| 7,403,977 B2 | * | 7/2008 | Kalenius et al. | 709/217 |
| 7,546,555 B2 | * | 6/2009 | Guo et al. | 715/864 |
| 7,573,463 B2 | * | 8/2009 | Liess | 345/170 |
| 2004/0046748 A1 | * | 3/2004 | Kwon | 345/173 |
| 2004/0198475 A1 | | 10/2004 | Kim | |
| 2005/0034081 A1 | * | 2/2005 | Yamamoto et al. | 715/810 |
| 2006/0022951 A1 | | 2/2006 | Hull | |

FOREIGN PATENT DOCUMENTS

| | | |
|---|---|---|
| CN | 1599895 A | 3/2005 |
| CN | 1614537 A | 5/2005 |
| EP | 0872996 A2 | 10/1998 |
| JP | 10-241491 | 9/1998 |
| JP | 2002-163063 | 6/2002 |
| KR | 1999-0050095 | 7/1999 |
| KR | 2003-0032224 | 4/2003 |
| KR | 10-2004-0056390 | 7/2004 |
| KR | 10-2004-0087630 | 10/2004 |

(Continued)

OTHER PUBLICATIONS

PCT Notification of Transmittal of the International Search Report and the Written Opinion of the International Searching Authority, or the Declaration dated Sep. 3, 2007, 3 pgs (in English).

(Continued)

*Primary Examiner* — Richard Hjerpe
*Assistant Examiner* — Sahlu Okebato
(74) *Attorney, Agent, or Firm* — Staas & Halsey LLP

(57) ABSTRACT

An input apparatus and method using optical masking which enable a user to intuitively manipulate a menu by mapping light sources of an optical masking sensing unit and icons displayed on a display panel to corresponding positions. The input apparatus includes a display panel displaying a plurality of icons and functions of the icons, and an optical masking sensing unit including a plurality of optical devices as light sources, turning on optical devices located at positions corresponding to positions of the displayed icons.

22 Claims, 16 Drawing Sheets

FOREIGN PATENT DOCUMENTS

WO      WO03/003181 A2      1/2003
WO      WO2004/021158      3/2004

OTHER PUBLICATIONS

PCT Written Opinion of the International Searching Authority dated Sep. 3, 2007, 4 pgs (in English).

PCT International Search Report dated Sep. 3, 2007, 3 pgs (in English).

Chinese Office Action for corresponding Chinese Patent Application No. 200780023132.4 dated Jun. 17, 2010, pp. 1-5.

European Search Report for corresponding European Patent Application No. 07746694.4 dated Oct. 19, 2011, 7 pgs (in English).

\* cited by examiner

INPUT APPARATUS AND METHOD USING OPTICAL MASKING

CROSS-REFERENCE TO RELATED APPLICATIONS

This application claims the benefit of Korean Patent Application No. 10-2006-0055028 filed on Jun. 19, 2006 in the Korean Intellectual Property Office, the disclosure of which is incorporated herein by reference in its entirety.

BACKGROUND OF THE INVENTION

1. Field of the Invention

The present invention relates to an input apparatus and method using optical masking. More particularly, to an input apparatus and method using optical masking which enables a user to intuitively manipulate a menu by mapping light sources of an optical masking sensing unit and icons displayed on a display panel to corresponding positions.

2. Description of the Related Art

With the rapid development of communications technology, mobile devices that enable users to perform voice and data communications while on the move have been developed and widely used.

Generally, two-dimensional (2D) and three-dimensional (3D) image objects are provided on display panels of mobile devices as a way to display various menus for operating diverse functions of the mobile devices. In this case, when a user desires to select a plurality of menu icons to perform a function, the user has to manipulate a button (e.g., a mechanical button or a touch sensor button) for the function.

For example, if the user selects a corresponding menu icon to use a menu, the selected menu icon is activated, and a menu screen is displayed. However, the user may not know which button to select to operate the menu displayed. Consequently, the user has to select one or more buttons to operate a desired menu.

In addition, in the case of touch sensor buttons, if a user fails to precisely select a touch sensor button, the user may mistakenly select adjacent touch sensor buttons, thereby causing malfunction.

Korean Patent Publication No. 2004-0056390, entitled "Key Input Apparatus and Method Using Optical Sensor," relates to a key input apparatus using an optical sensor which can recognize a selected character or figure, and thus, reduces the number of parts included in the key input apparatus, and a key input method used by the key input apparatus. Specifically, the key input apparatus includes a plurality of light sources embodying coordinates of keys, a plurality of optical sensors implemented at positions corresponding to those of the light sources and sensing light emitted by the light sources, and a circuit recognizing a blocked optical sensor and reading coordinates. However, this conventional technology fails to suggest a method of mapping displayed icons and the light sources, which can select the displayed icons, to be corresponding positions and intuitively manipulating the displayed icons.

SUMMARY OF THE INVENTION

Accordingly it is an aspect of the present invention to search for optical devices to be turned on based on position values of icons displayed on a display panel, turn on the found optical devices, and map the displayed icons and light sources emitted by the turned-on optical devices to corresponding positions.

It is another aspect of the present invention to enable a user to intuitively carry out required manipulations to perform a function by mapping displayed icons and light sources to corresponding positions.

Additional aspects and/or advantages of the invention will be set forth in part in the description which follows and, in part, will be apparent from the description, or may be learned by practice of the invention.

The foregoing and/or other aspects of the present invention are achieved by providing an input apparatus using optical masking. The input apparatus includes a display panel displaying a plurality of icons and functions corresponding to the icons, and an optical masking sensing unit including a plurality of optical devices as light sources, turning on optical devices located at positions corresponding to positions of the displayed icons.

It is another aspect of the present invention to provide an input apparatus using optical masking. The input apparatus includes a light-emitting unit turning on optical devices and providing light sources on an optical masking sensing unit, a light reception checking unit sensing a light source masked and reflected and detecting a position of a masked optical device based on the reflected light source, a control unit searching for an icon selected by a user based on the detected position of the optical device and displaying the found icon, and an optical device management unit detecting an optical device to be turned on based on position information of the displayed icon.

It is another aspect of the present invention to provide a method of controlling an input apparatus using optical masking. The method includes sensing a light source selected and masked by a user, searching for position information of the sensed light source and searching for an icon corresponding to the found position information, detecting optical devices corresponding to positions of sub-icons of the found icon based on information regarding the sub-icons, and displaying the sub-icons and turning on the detected optical devices.

BRIEF DESCRIPTION OF THE DRAWINGS

These and/or other aspects and advantages of the invention will become apparent and more readily appreciated from the following description of the embodiments taken in conjunction with the accompanying drawings or which.

DETAILED DESCRIPTION OF THE PREFERRED EMBODIMENTS

Figure 1:
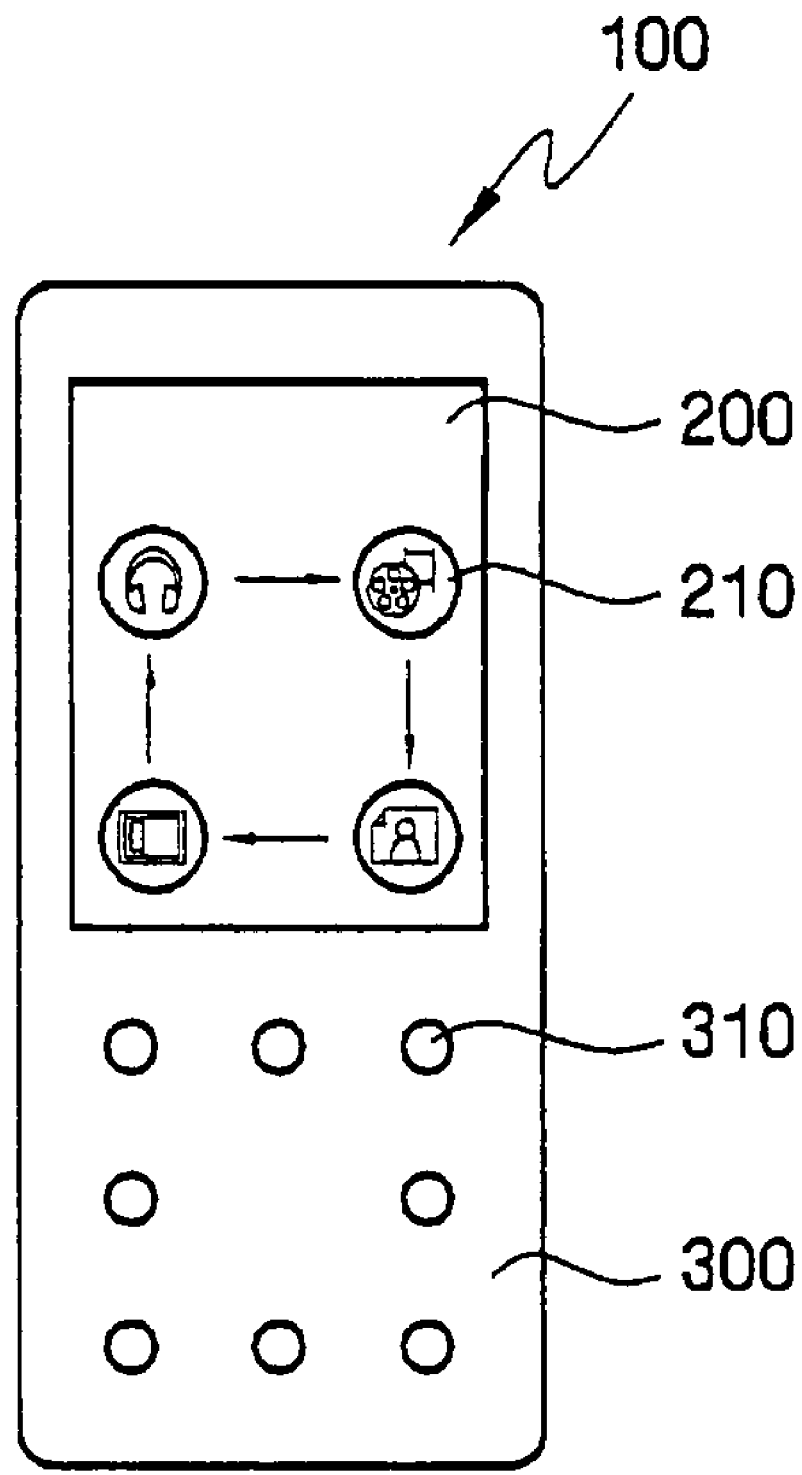
FIG. 1 illustrates an input apparatus using optical masking according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates an input apparatus 100 using optical masking according to an embodiment of the present invention.

As shown in FIG. 1, the input apparatus 100 according to an embodiment of the present invention comprises a display panel 200 and an optical masking sensing unit 300. The input apparatus 100 is an apparatus which can display information and through which a command for controlling a function can be input. Examples of the input apparatus 100 comprises, for example, mobile devices, such as mobile telephones, personal communications services (PCSs), wireless communication terminals and personal digital assistances (PDAs), personal computers, notebooks, and automatic teller machines (ATMs), etc.

The display panel 200 displays a plurality of icons 210. The icons 210 comprise two-dimensional (2D) and three-dimensional (3D) characters, web pages, pictures and moving images. In addition, the icons 210 cover all graphical user interface (GUI) components such as pull-down menus and buttons.

While the icons 210 are displayed on the display panel 200, when a user selects a light source from a plurality of light sources 310 in the optical masking sensing unit 300, sub-icons of an icon located at a position corresponding to the position of the selected light source are provided or a function of the icon is performed.

The optical masking sensing unit 300 comprises a plurality of optical devices (not shown). The optical devices are light-emitting devices and light-receiving devices, for example, light-emitting diodes (LEDs). According to an embodiment of the present invention, the light-emitting devices and the light-receiving devices are implemented separately. According to another embodiment of the present invention, the light-emitting devices and the light-receiving devices are integrated together as light-emitting/light-receiving devices. The light sources 310, which are emitted by the optical devices, penetrate a transparent plate and are arranged on the optical masking sensing unit 300.

When a user selects a light source from the light sources 310 emitted by the light-emitting devices using a finger, the selected light source is masked by the finger of the user. Accordingly, a light-receiving device senses the light source reflected by the user's finger and thus, detects the position of an optical device(i.e., a light-emitting device), selected by the user.

Then, an icon located at a position corresponding to the detected position of the optical device is operated (or sub-icons of the icon are activated).

Of the optical devices included in the optical masking sensing unit 300, optical devices placed at predetermined positions are turned on to be mapped to the icons 210 displayed on the display panel 200. In addition, according to an embodiment of the present invention, a controllable direction for operating (or selecting) the displayed icons 210 are displayed on the light sources 310 emitted by the optical devices.

The light sources 310 emitted by the optical devices are selected by a tap, a scroll or a multi-input by a user.

For example, when a user has to select a light source though a scrolling operation, the controllable direction (i.e., an arrow) is displayed on a screen of the display panel 200 or on the selected light source to induce the user to intuitively perform the scrolling operation. An example of a case where a user taps or scrolls a light source will be described later with reference to FIGS. 6A-6C.

Figure 2:
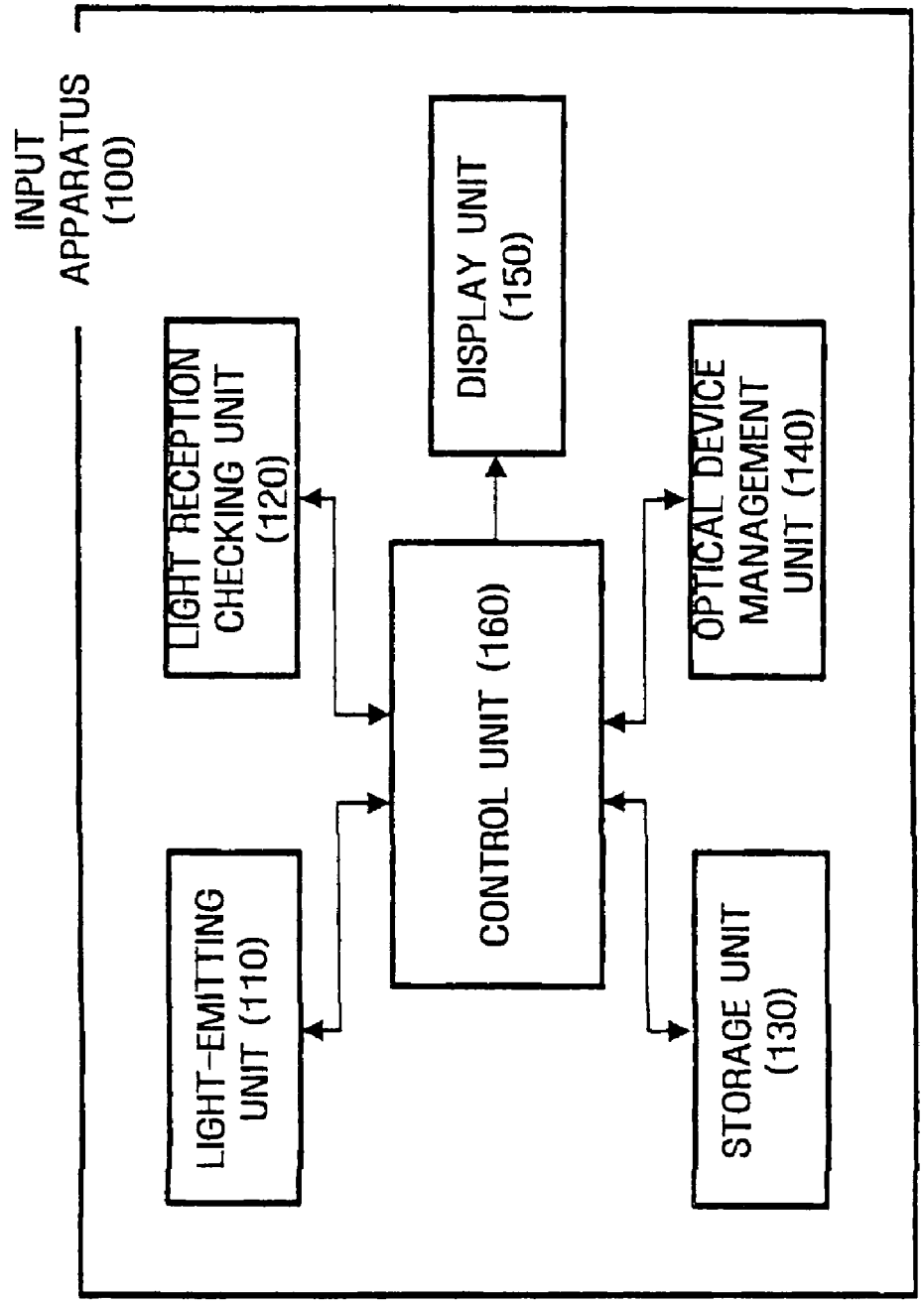
FIG. 2 is a block diagram of an input apparatus according to an embodiment of the present invention.

FIG. 2 is a block diagram of an input apparatus according to an embodiment of the present invention as illustrated in FIG. 1.

As shown in FIG. 2, the input apparatus 100 comprises a light-emitting unit 110, a light reception checking unit 120, a storage unit 130, an optical device management unit 140, a display unit 150, and a control unit 160.

The term 'unit', as used in embodiments of the present invention, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

The light-emitting unit 110 turns on some of light-emitting devices included in the optical masking sensing unit 300. The light-emitting devices turned on are those located at coordinates corresponding to the positions of the icons 210 displayed on the display panel 200. In other words, the light-emitting devices are turned on or off according to the positions of the icons 210 displayed on the display panel 200.

For example, light-emitting devices having position values corresponding to those of the icons 210 displayed on the display panel 200 are turned on. Accordingly, the displayed icons 210 and the light sources 310 emitted by the turned-on light-emitting devices are mapped to corresponding positions.

Therefore, a user can intuitively select one of the light sources 310 emitted by the light-emitting devices at a position mapped to a desired icon and thus operate the desired icons more easily.

The light reception checking unit 120 senses a light source which is masked and reflected by the finger of the user and detects the position of an optical device (e.g., a light-emitting device) selected by the user based on the sensed light source. A value of the detected position of the optical device is used to operate (or activate) a corresponding icon.

The storage unit 130 stores icons displayed on the display panel 200 and information regarding functions corresponding to the icons. The information includes position information of icons currently displayed, operation information of the icons, information regarding sub-icons, and position information of the sub-icons.

The storage unit 130 also stores position coordinate values of the optical devices such that a position value of a light source (i.e., an optical device) selected by a user, which is detected by the light reception checking unit 120, can be searched for or that the displayed icons 210 and the light sources 310 can be mapped to corresponding positions.

The optical device management unit 140 manages the optical devices such that the icons 210 displayed on the display panel 200 and the light sources 310 emitted by the optical masking sensing unit 300 can be mapped to corresponding positions.

For example, according to an embodiment of the present invention, if nine menu icons are displayed on the display panel 200, the optical device management unit 140 retrieves position information of the nine displayed menu icons from the storage unit 130, and finds and turns on optical devices corresponding to the retrieved position values of the nine displayed menu icons. Accordingly, the nine optical devices having position values corresponding to those of the displayed nine menu icons are turned on, and the nine menu icons and light sources arranged on the optical masking sensing unit 300 are mapped to corresponding positions.

In addition, the optical device management unit 140 displays a controllable direction of the icons 210 on the light sources 310 emitted by the turned-on optical devices. The controllable direction displayed by the optical device management unit 140 denotes a direction selected from an up/down/right/left direction, a clockwise direction, and a counter-clockwise direction in order to perform a function. Examples of light sources emitted by turned-on optical devices in order to be mapped to icons and a method of displaying a controllable direction on the light sources will be described in detail later with reference to FIGS. 8A-8D.

The display unit 150 displays the icons 210, an operation of an icon activated after the user manipulates buttons, and sub-icons of the activated icon on the display panel 200.

The control unit 160 retrieves information regarding an icon corresponding to the position information of an optical device selected by the user, which is detected by the light reception checking unit 120, from the storage unit 130. Then, the control unit 160 displays sub-icons of the icon or an operation of the icon on a screen of the display unit 150 based on the retrieved information regarding the icon.

Furthermore, the control unit 160 controls the operations of the light-emitting unit 110, the light reception checking unit 120, the storage unit 130, the optical device management unit 140 and the display unit 150 included in the input apparatus 100.

Figure 3:
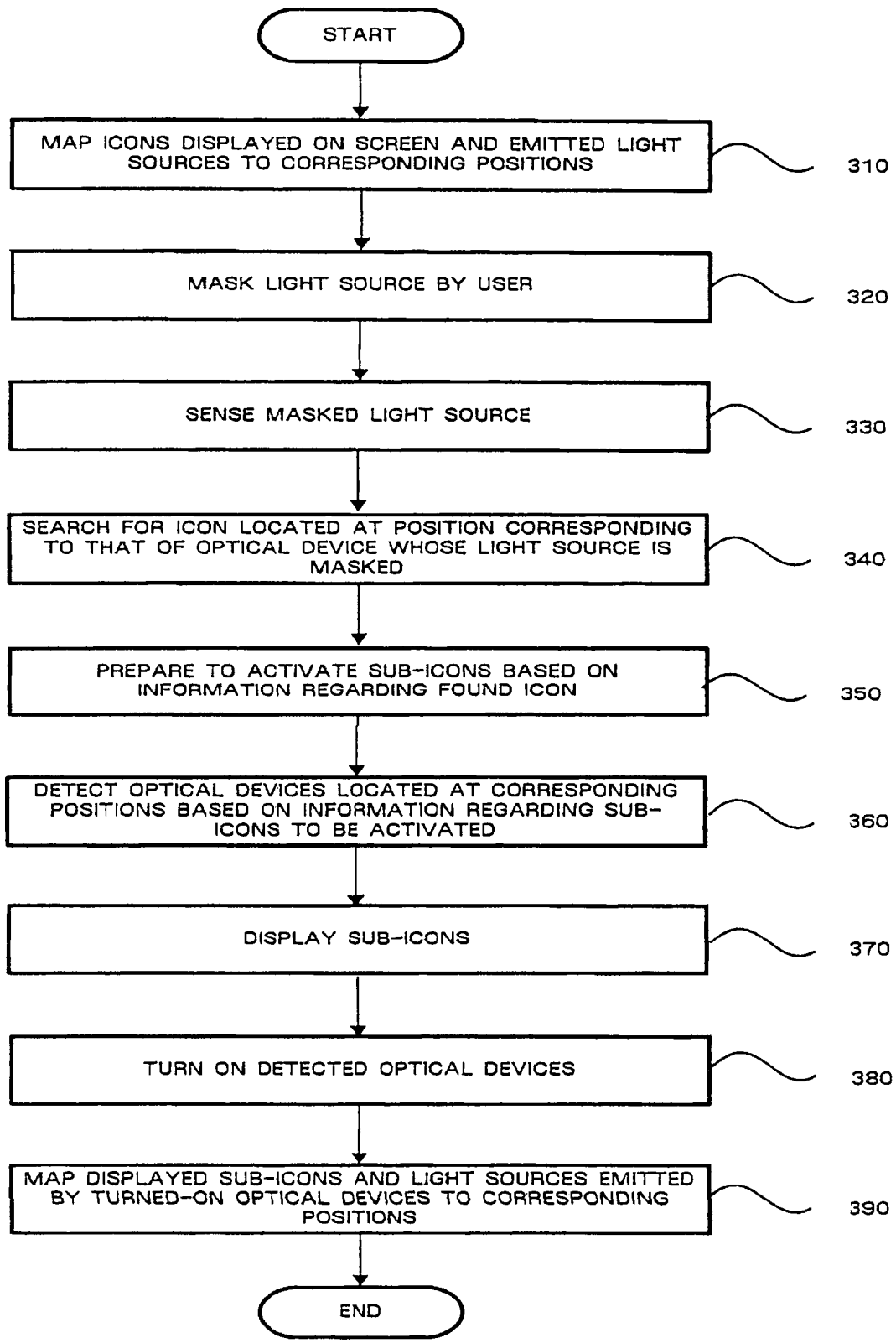
FIG. 3 is a flowchart illustrating a method of controlling an input apparatus according to an embodiment of the present invention.

FIG. 3 is a flowchart illustrating a method of controlling the input apparatus 100 according to an embodiment of the present invention.

In FIG. 3, in operation 310, the icons 210 are displayed on the display panel 200 of the input apparatus 100, and optical devices located at positions corresponding to those of the displayed icons 210 are turned on. Accordingly, the light sources 310 emitted by the turned-on optical devices are arranged on the optical masking sensing unit 300.

Next, in operation 320, when a user selects one of the emitted light sources 310 arranged on the optical masking sensing unit 300 using a finger, the selected light source is masked and reflected in an opposite direction.

Then, in operation 330, the light reception checking unit 120 senses the light source masked and reflected as selected by the user.

The light reception checking unit 120 transmits a position value of an optical device corresponding to the reflected light source to the control unit 160. Then, in operation 340, the control unit 160 searches for information regarding an icon corresponding to the position value of the reflected light source received from the light reception checking unit 120.

Next, in operation 350, the optical management unit 140 checks position information of sub-icons to be displayed based on the information regarding the icon found and, in operation 360, the optical management unit 140 detects optical devices to be turned on based on the checked position information of the sub-icons.

Accordingly, in operation 370, the control unit 160 displays the sub-icons on the screen of the display unit 150 based on the position information of the sub-icons, and in operation 380, the optical device management unit 140 turns on the detected optical devices. An example of a method of detecting optical devices to be turned on will be described in detail later with reference to FIGS. 5A-5B.

The displayed sub-icons and the light sources 310 emitted by the turned-on optical devices are mapped to corresponding positions in operation 390.

Therefore, if the user selects a light source located at a position corresponding to that of a desired icon, the user can operate the desired icon. In other words, the use can intuitively control the input apparatus 100.

Figure 4A:
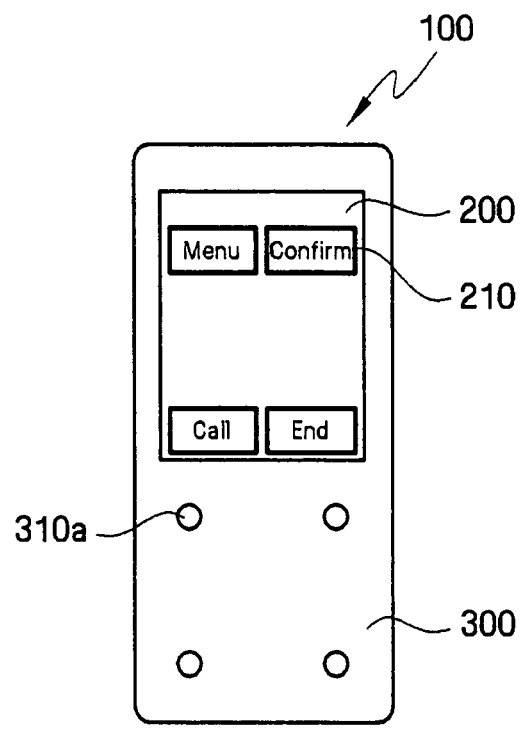
FIGS. 4A-4C are views illustrating operations of an input apparatus using optical masking according to an embodiment of the present invention.
Figure 4B:
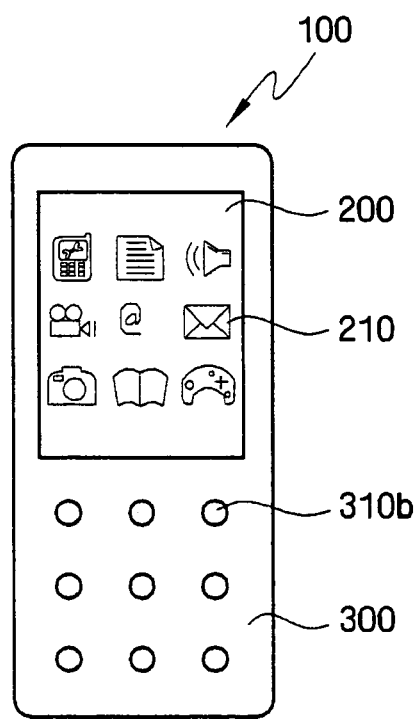
Figure 4C:
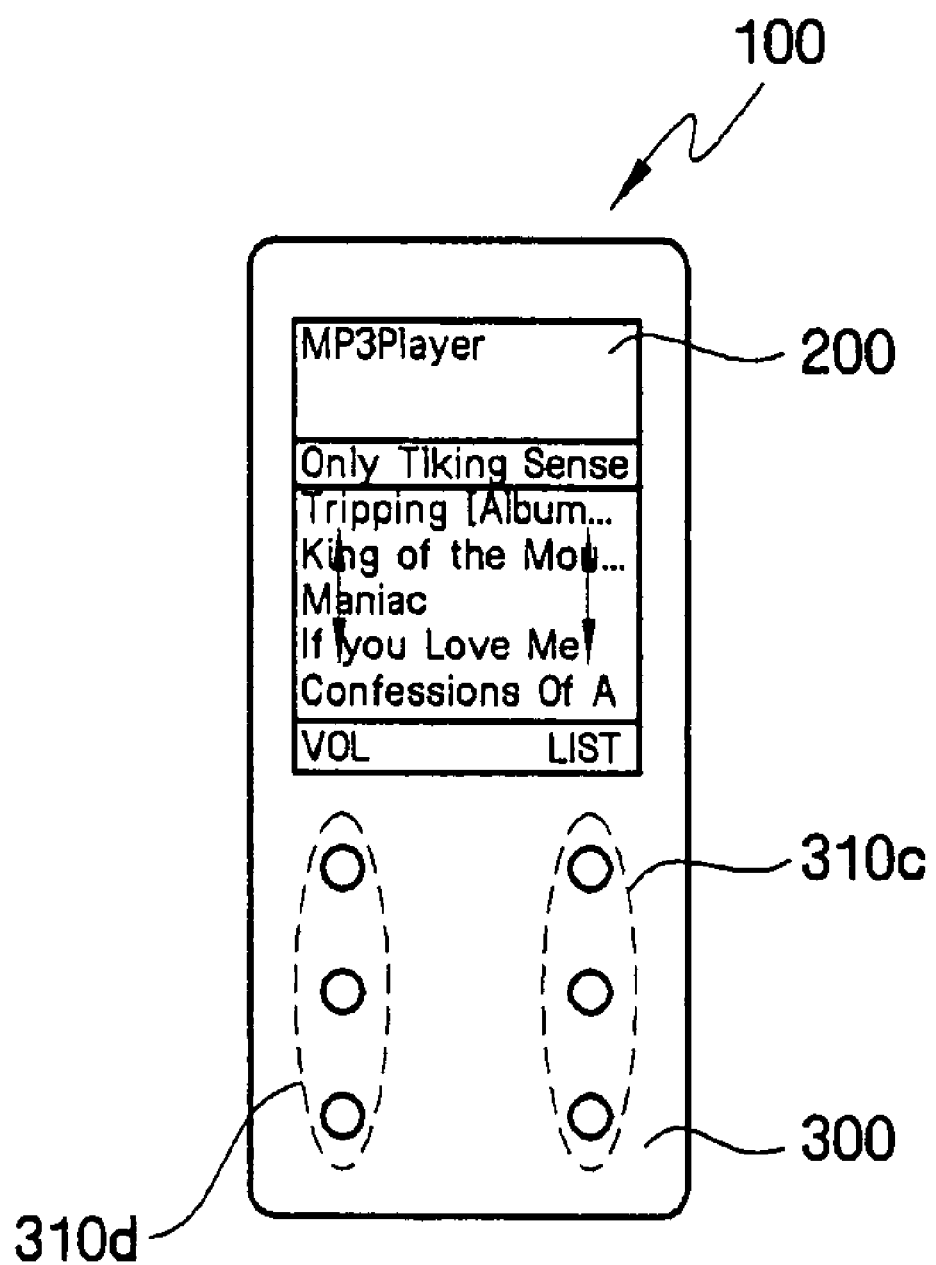

FIGS. 4A-4C is a view illustrating an operation of an input apparatus 100 using optical masking according to an embodiment of the present invention. In this embodiment, a mobile device (i.e., a mobile phone) is used as an example of the input apparatus 100.

In FIG. 4A, 'Menu,' 'Confirm,' 'Call,' and 'End' icons are displayed on a display panel 200 of the input apparatus 100 (i.e., the mobile phone), and some of the optical devices included in an optical masking sensing unit 300 located at positions corresponding to those of the displayed icons are turned on. Accordingly, light sources emitted by the turned-on optical devices are arranged on the optical masking sensing unit 300.

If a user selects a light source 310a at a position mapped to the 'Menu' icon using a finger in order to use the function of the 'Menu' icon, the light source 310a is masked by the finger of the user and reflected in an opposite direction. Then, the position of an optical device corresponding to the light source 310a selected by the user is detected, and information regarding an icon located at a position corresponding to the detected position of the optical device is searched for.

Next, as shown in FIG. 4B, sub-icons of the icon are displayed on the display panel 200 based on the found information regarding the icon, and optical devices to be turned on are detected based on position information of the sub-icons.

Then, the detected optical devices are turned on, and, accordingly, light sources emitted by the turned-on optical devices are arranged on the optical masking sensing unit 300. In other words, the displayed sub-icons and the emitted light sources are mapped to corresponding positions.

If the user selects a light source 310b located at a position mapped to a sub-icon to use the function of the sub-icon, the sub-icon located at the position corresponding to that of the selected light source 310b is activated.

In other words, playlists included in the activated sub-icon are displayed on the display panel 200 as shown in FIG. 4C, and light sources 310c and 310d which can control the displayed playlists are arranged on the optical masking sensing unit 300.

For example, 'Vol' and 'List' icons are provided at the bottom of the display panel 200, and the playlists and a controllable direction (↕) are displayed on the screen of the display panel 200.

In addition, optical devices located at positions corresponding to those of the 'Vol' and 'List' icons are turned on, and, accordingly, the light sources 310d and 310c corresponding to the optical devices are provided on the optical masking sensing unit 300. The light sources 310c provided in the right part of the optical masking sensing unit 300 can select a desired playlist by moving between playlists, and the light sources 310d provided in the left part of the optical masking sensing unit 300 can adjust the volume of a piece of music being played back.

Therefore, the user can intuitively operate a desired function by scrolling the light sources 310d or 310c corresponding to the 'Vol' or 'List' icon.

Figure 5A:
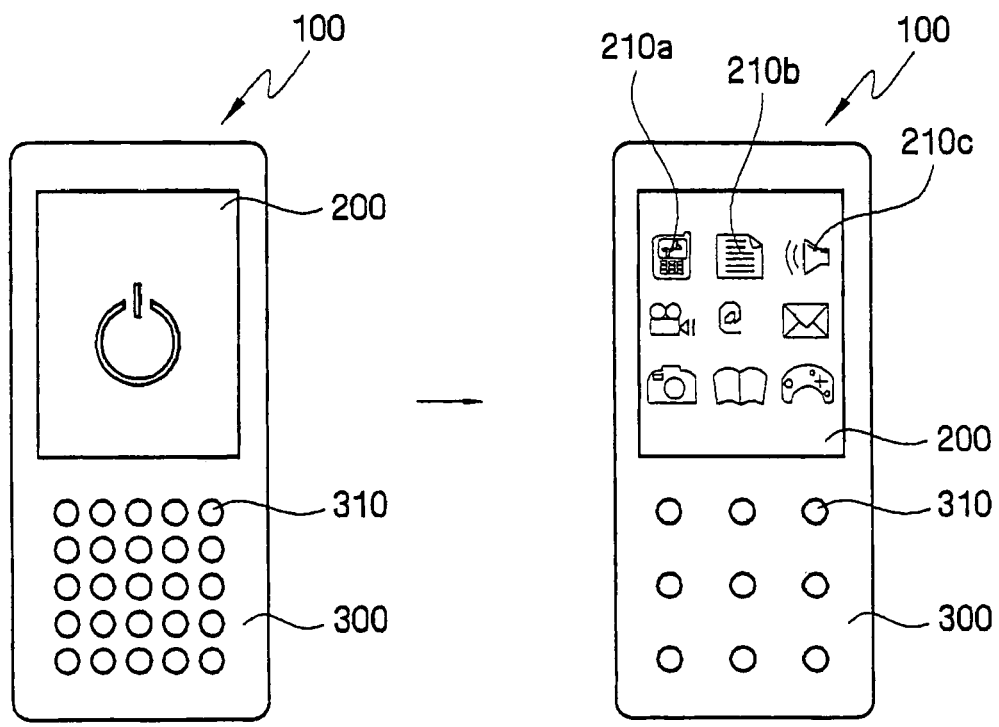
FIGS. 5A and 5B are views illustrating a method of detecting optical devices to be turned on in an input apparatus using optical masking according to an embodiment of the present invention.
Figure 5B:
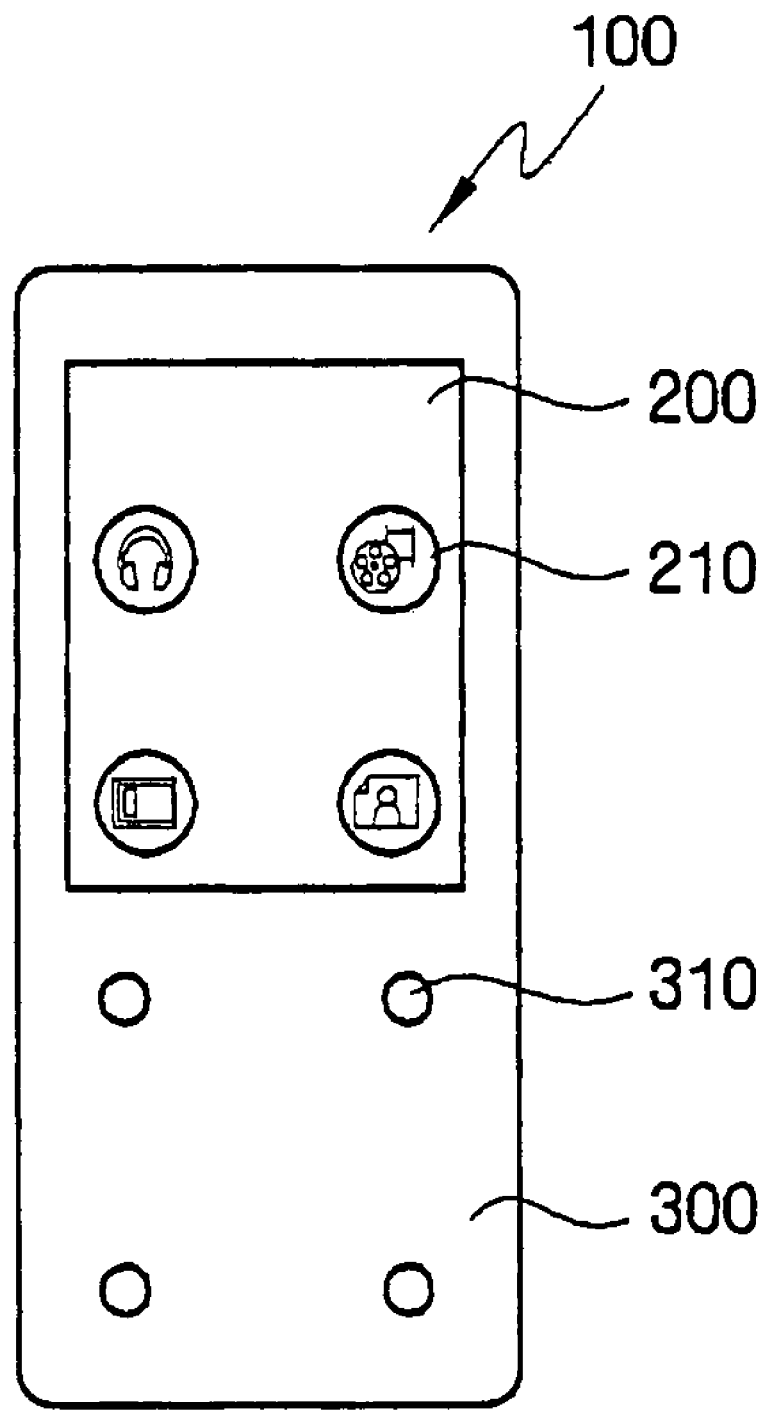

FIGS. 5A and 5B are views illustrating a method of detecting optical devices to be turned on in an input apparatus 100 using optical masking according to an embodiment of the present invention.

Referring to FIG. 5A, a plurality of optical devices (not shown) are included in an optical masking sensing unit 300. The optical devices are turned on, and light sources 310 emitted by the turned-on optical devices are arranged on the optical masking sensing unit 300. Optical devices to be turned on are determined by the positions of displayed icons.

For example, if a user selects an icon, the selected icon is activated, and sub-icons of the icon are displayed on a display panel 200. Then, some of the optical devices included in the optical masking sensing unit 300 having position values corresponding to those of the displayed sub-icons are turned on.

That is, the position values of first through third sub-icons 210a-210c displayed on the display panel 200 are set to (1,1), (2,1) and (3,1), respectively.

In addition, the position values of first through third optical devices included in the optical masking sensing unit 300 are set to (1,1), (2,1) and (3,1), respectively.

Therefore, if predetermined sub-icons are displayed, optical devices having position values corresponding to those of the displayed sub-icons are turned on. Accordingly, the displayed sub-icons and some of the light sources 310 emitted by the turned-on optical devices are mapped to corresponding positions.

As shown in FIG. 5B, according to an embodiment of the present invention, if four icons 210 are displayed at predetermined positions on the display panel 200, position values of the displayed icons 210 are searched for.

As a result of the search, if the position values of the displayed icons 210 are (1,1), (1,4), (4,1) and (4,4), optical devices having position values of (1,1), (1,4), (4,1) and (4,4) among the optical devices included in the optical masking sensing unit 300 are turned on and the remaining optical devices having different position values are not turned on.

Therefore, the displayed sub-icons 210 and light sources 300 emitted by the turned-on optical devices are mapped to corresponding positions.

Figure 6A:
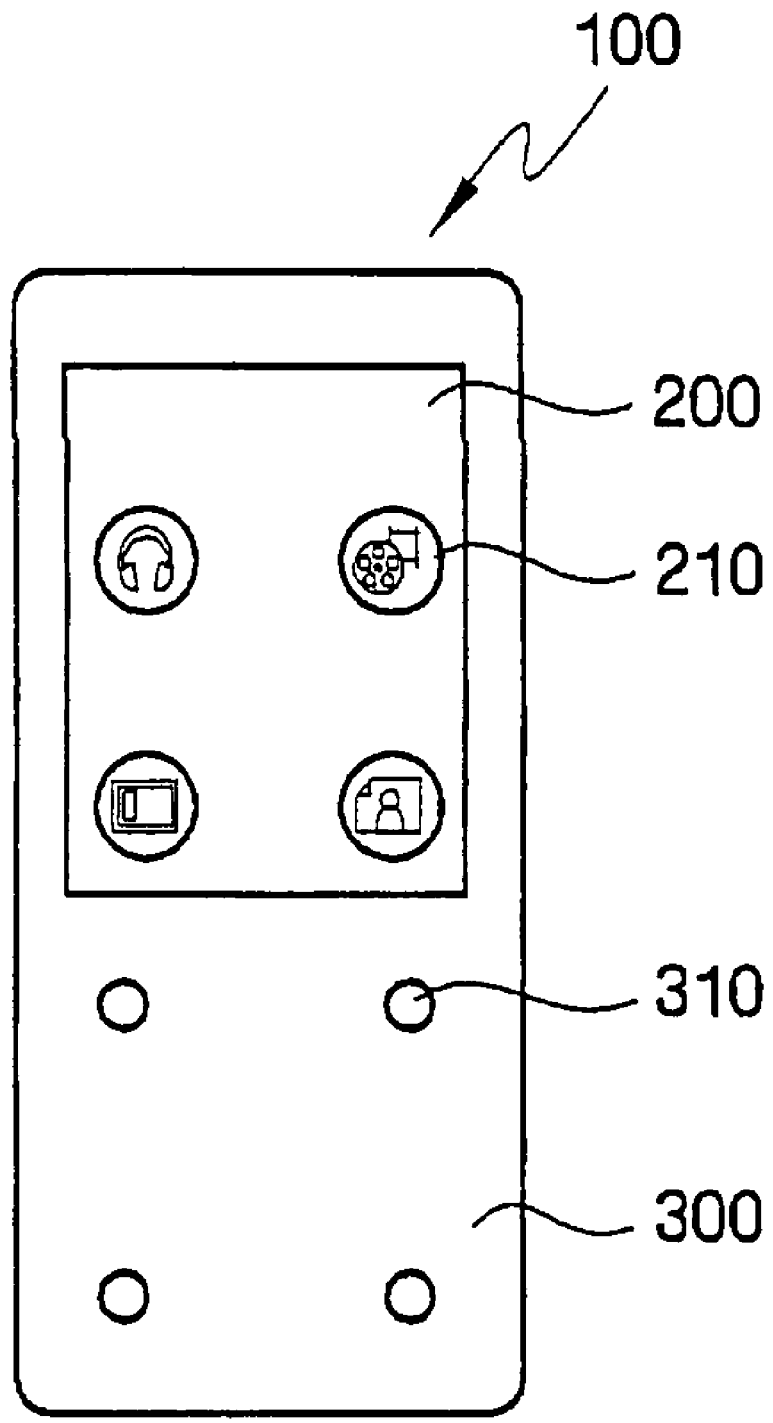
FIGS. 6A-6C are views illustrating a method of mapping icons displayed on a display panel of an input apparatus using optical masking to light sources of an optical masking sensing unit according to another embodiment of the present invention.
Figure 6B:
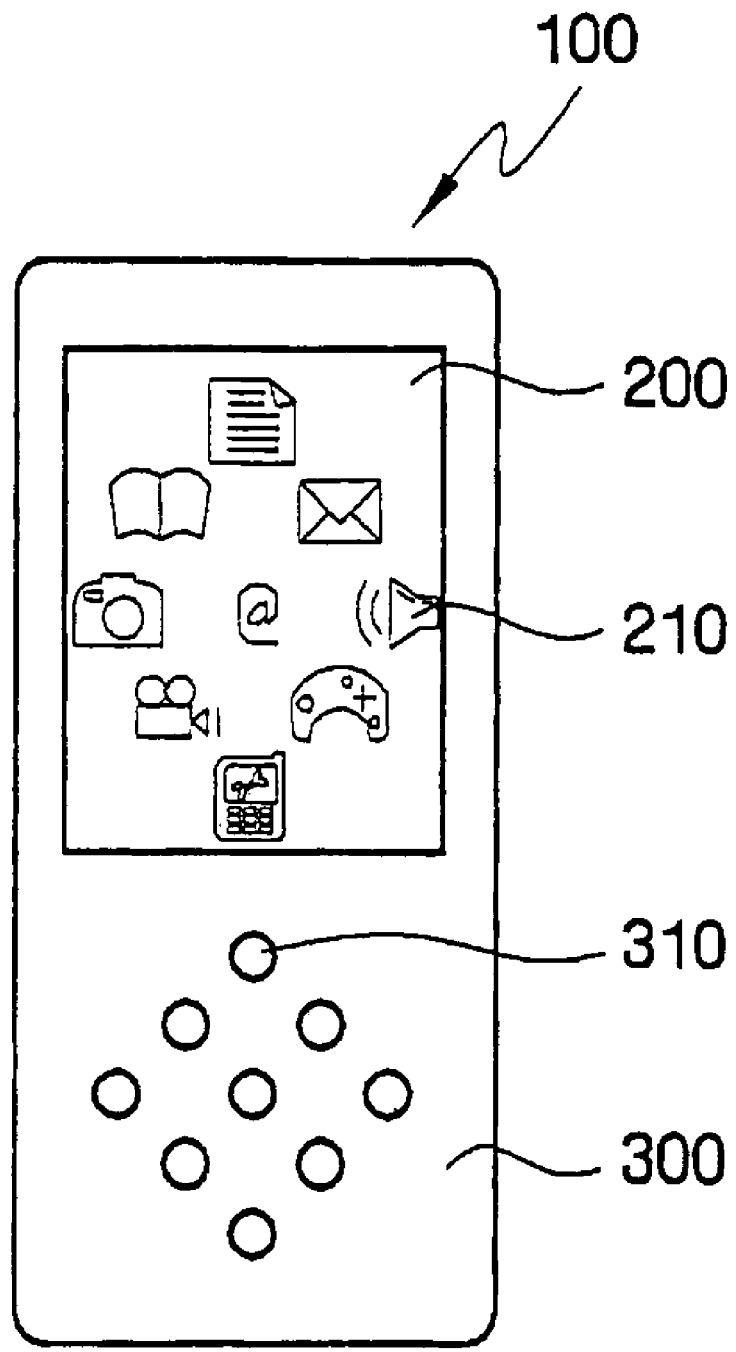
Figure 6C:
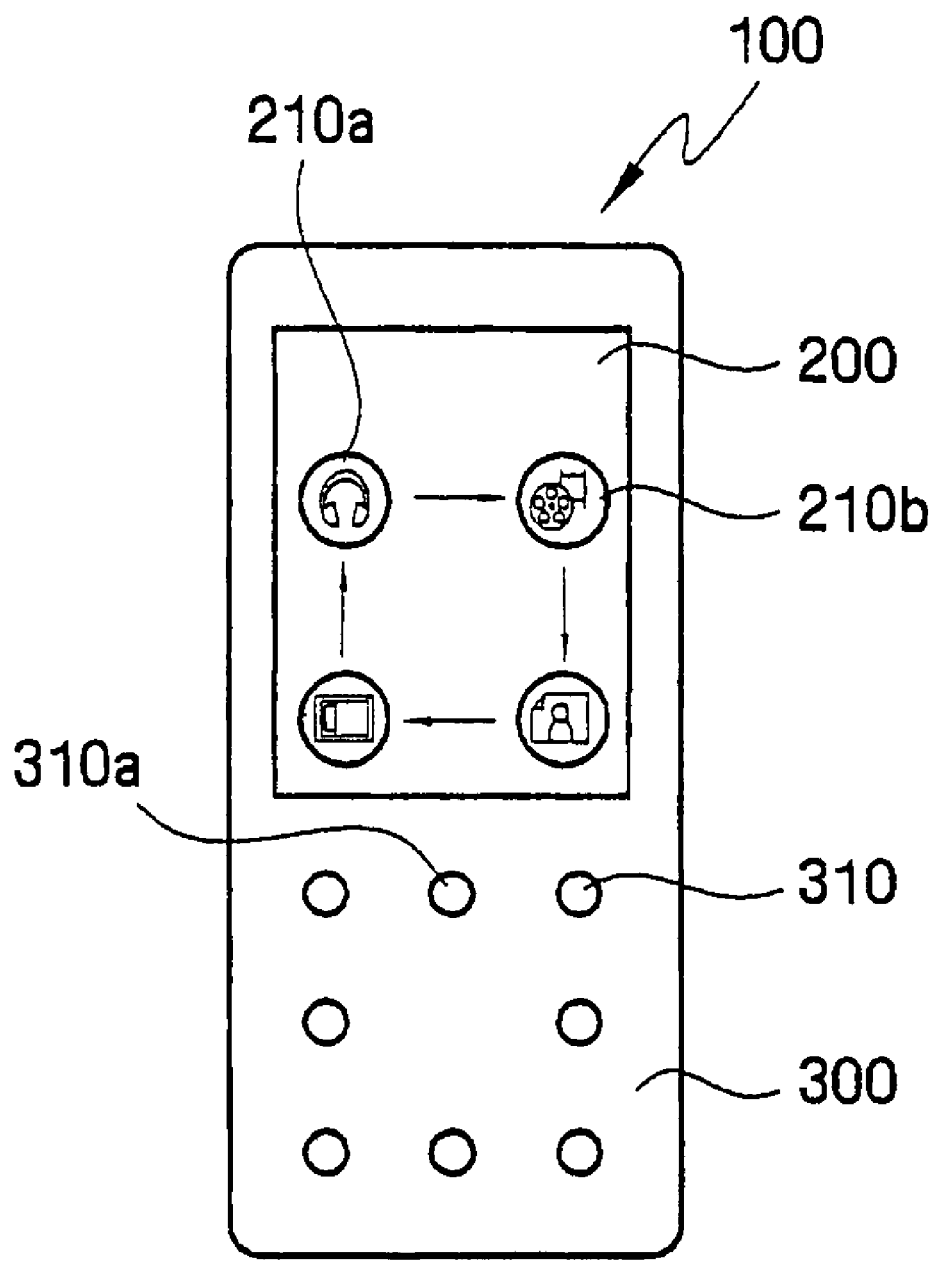

FIGS. 6A-6C are views illustrating a method of mapping menu icons 210 displayed on a display panel 200 of an input apparatus 100 using optical masking to light sources 310 of an optical masking sensing unit 300 according to another embodiment of the present invention.

In FIGS. 6A and 6B, the icons 210 are displayed on the display panel 200 of the input apparatus 100, and optical devices located at positions corresponding to those of the displayed menu icons 210 are turned on. Accordingly, the light sources 310 emitted by the turned-on optical devices are arranged on the optical masking sensing unit 300. Here, a user taps one of the light sources 310 to make a selection.

In FIG. 6C, menu icons are displayed on the display panel 200 of the input apparatus 100.

To enable the user to select one of the displayed menu icons through a scrolling operation, optical devices located at positions corresponding to paths along which the displayed icons are slid by the user as well as optical devices located at positions corresponding to those of the displayed menu icons are turned on.

For example, the user can perform the scrolling operation from a music playback icon 210a to a moving-image playback icon 210b displayed on the display panel 200. Accordingly, an optical device 310a corresponding to a sliding path (i.e., →) of each of the music playback icon 210a and the moving-image playback icon 210b is turned on. The scrolling direction (that is, the sliding path) is provided on the display panel 200.

Figure 7A:
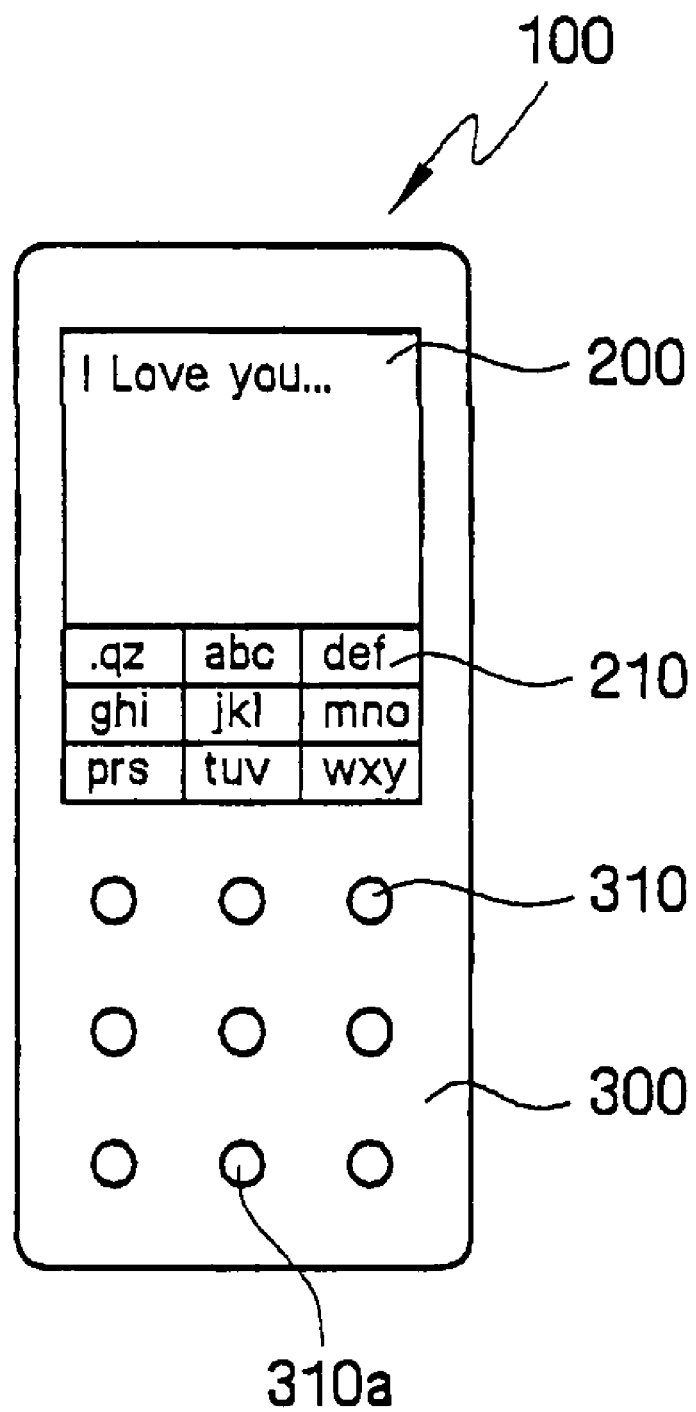
FIGS. 7A and 7B are views illustrating a method of mapping icons displayed on a display panel of an input apparatus using optical masking to light sources of an optical masking sensing unit according to another embodiment of the present invention.
Figure 7B:
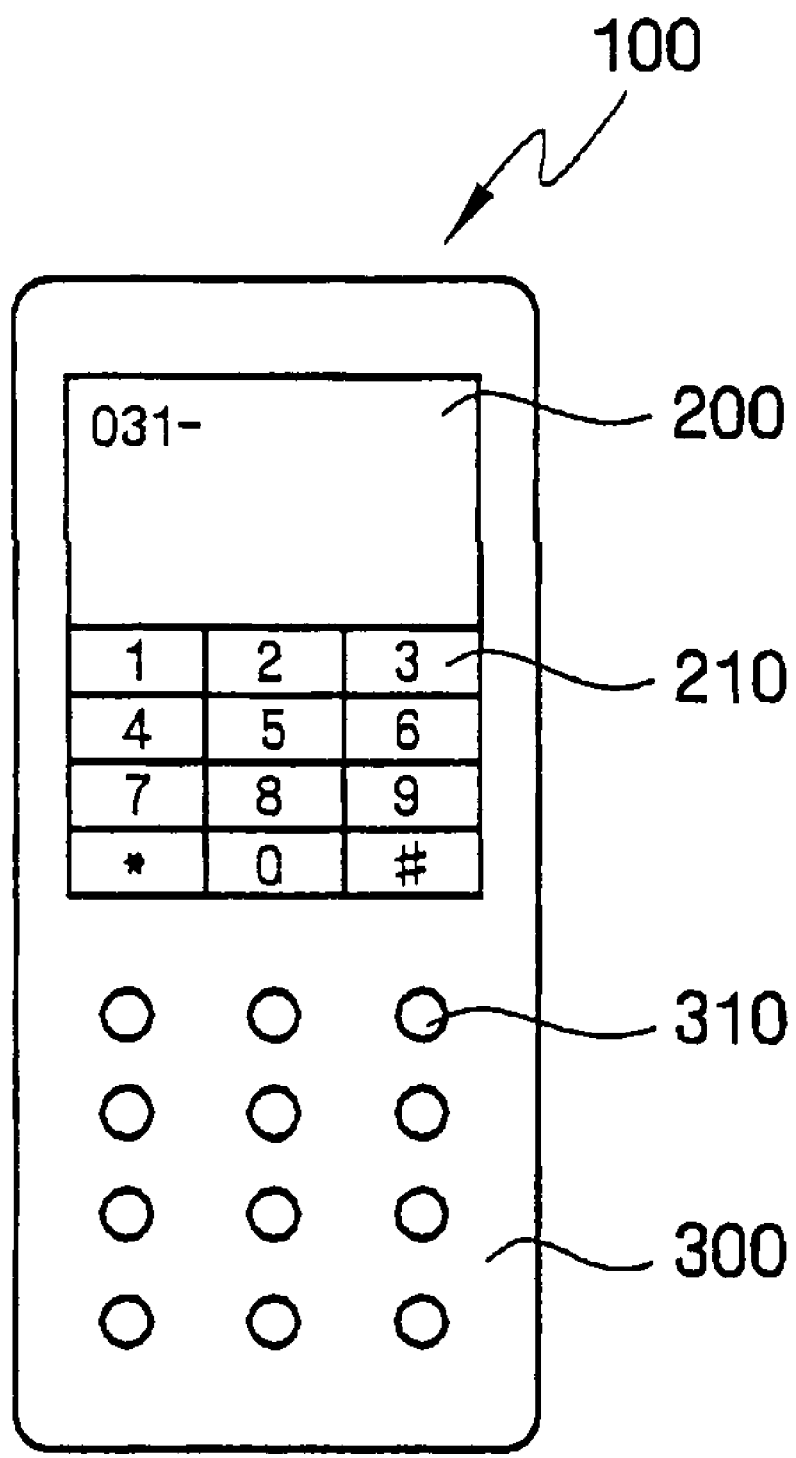

FIGS. 7A and 7B are views illustrating a method of mapping icons 210 displayed on a display panel 200 of an input apparatus 100 using optical masking to light sources 310 of an optical masking sensing unit 300 according to another embodiment of the present invention.

As shown in FIG. 7A, English icons 210 are displayed at the bottom of the display panel 200. Optical devices located at positions corresponding to those of the displayed English icons 210 are turned on, and the light sources 310 emitted by the turned-on optical devices are arranged on the optical masking sensing unit 300.

Accordingly, when a user desires to input an English character, the user selects a corresponding light source.

For example, according to an embodiment of the present invention, if the user intends to input an English character 'u,' the user may select a light source 310a located at a position corresponding to that of an English icon to which English characters 'tuv' are allocated.

As a result, the English character (e.g., 'u') input by the user is displayed at the top of the display panel 200.

As shown in FIG. 7B, numbers (i.e., a figure) and special characters (i.e., * and #) icons 210 are displayed at the bottom of the display panel 200. Optical devices located at positions corresponding to those of the displayed figure and special character icons 210 are turned on, and the light sources 310 emitted by the turned-on optical devices are arranged on the optical masking sensing unit 300.

Accordingly, when a user desires to input a figure, the user selects a corresponding light source.

FIGS. 8A-8D are views illustrating a method of displaying a controllable direction on light sources of an optical masking sensing unit 300 of an input apparatus 100 using optical masking according to another embodiment of the present invention.

Figure 8A:
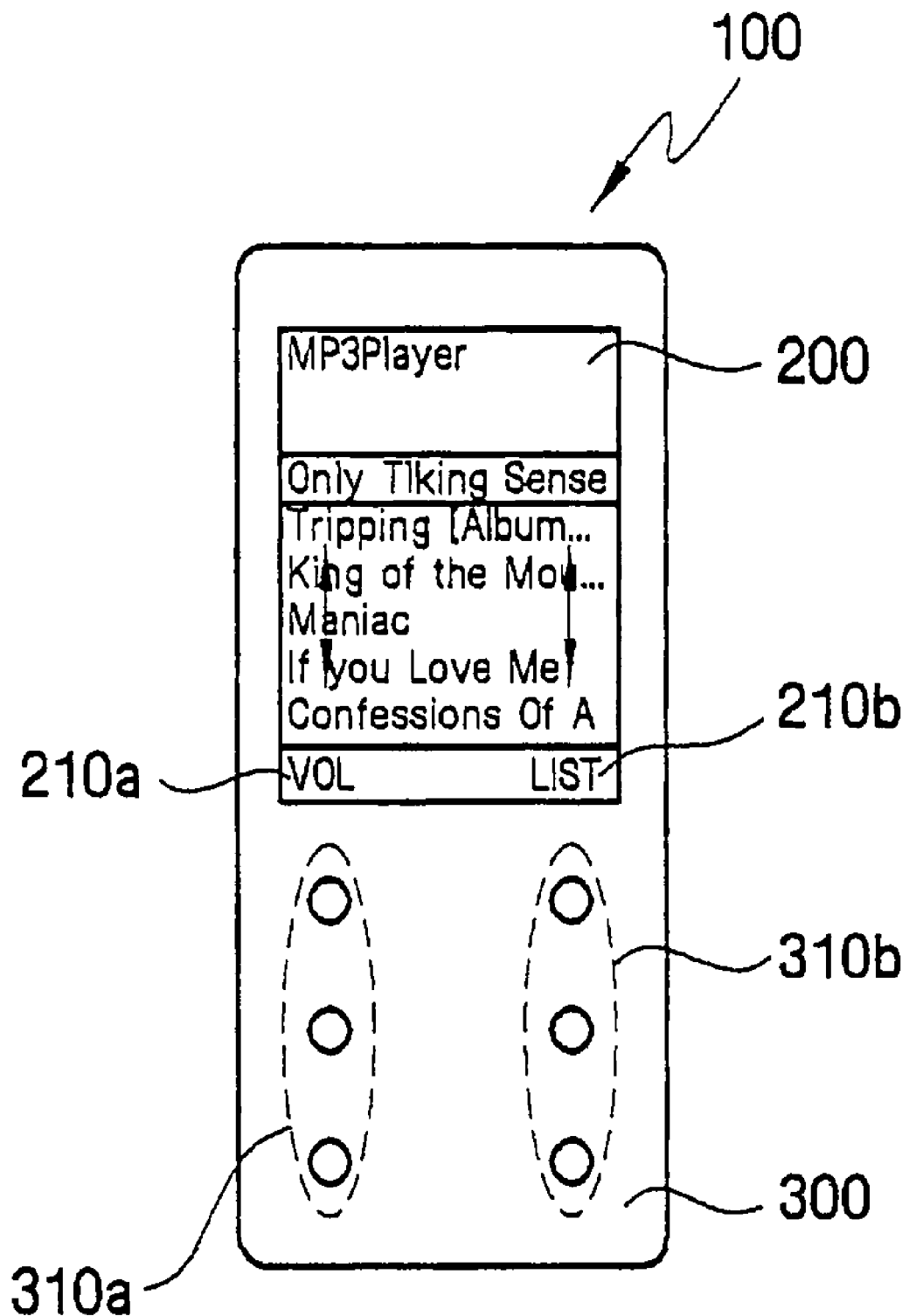
FIGS. 8A-8D are views illustrating a method of displaying a controllable direction on light sources of an optical masking sensing unit of an input apparatus using optical masking according to another embodiment of the present invention.

As shown in FIG. 8A, an MP3 playlist is displayed on a display panel 200. Also, a 'Vol' icon 210a and a 'List' icon 210b are displayed at the bottom of the display panel 200, and a controllable direction (↕) of the 'Vol' icon 210a and the 'List' icon 210b is displayed on the screen of the display panel 200.

Corresponding optical devices in the optical masking sensing unit 300 are searched for based on position values of the 'Vol' icon 210a and the 'List' icon 210b, and the found optical devices are turned on. Accordingly, lights sources 310a and 310b emitted by the turned-on optical devices are arranged on the optical masking sensing unit 300 at positions corresponding to those of the 'Vol' icon 210a and the 'List' icon 210b.

Hence, a user can adjust the volume of a piece of music currently being played back by scrolling the light sources 310a provided in the left part of the optical masking sensing unit 300. Also, if the user scrolls the light sources 310b provided in the right part of the optical masking sensing unit 300 to select a desired playlist, a pointer located at another playlist is moved to the desired playlist. Therefore, the use can select the desired playlist.

Figure 8B:
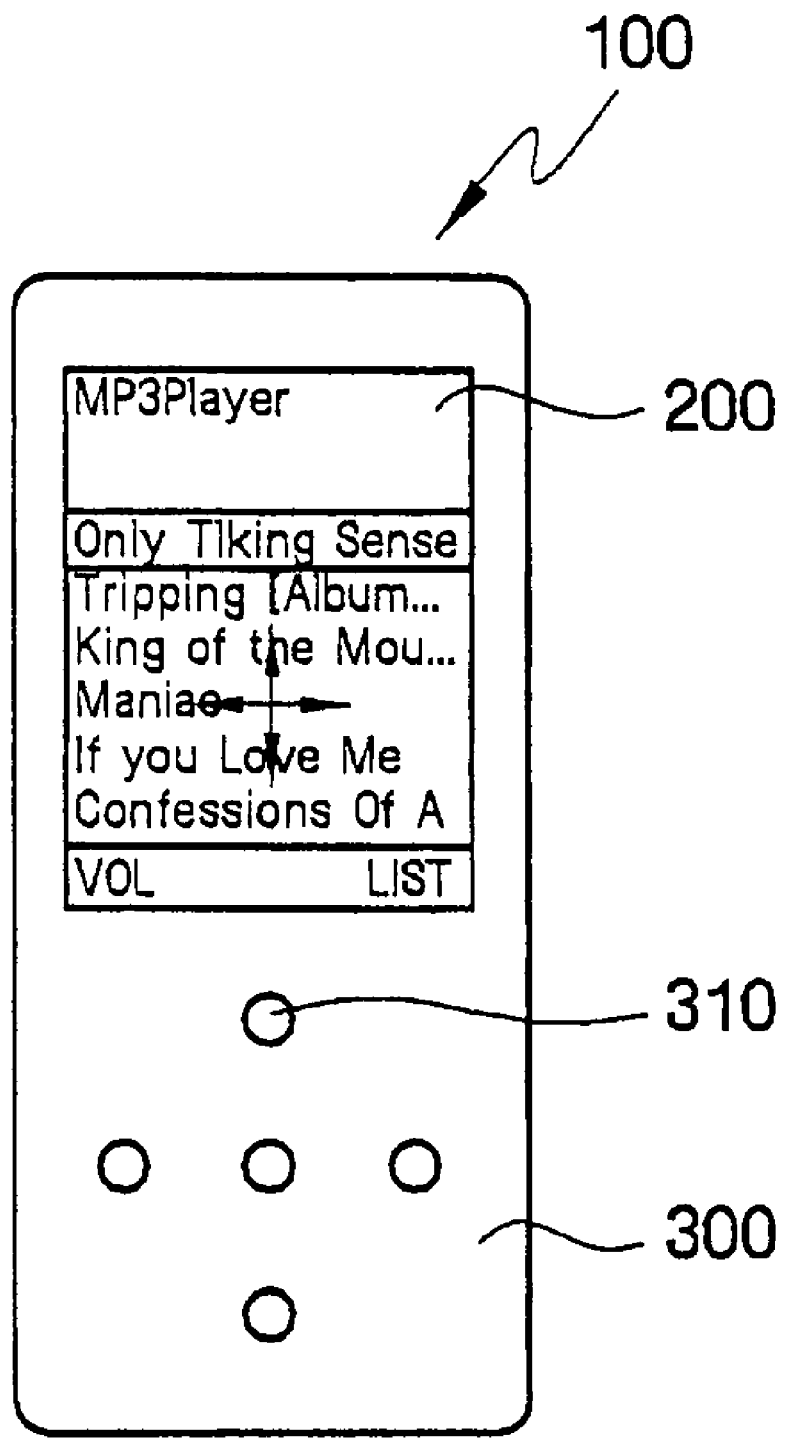

In FIG. 8B, an MP3 playlist is displayed on the display panel 200, and a controllable direction ($\oplus$) for searching for a playlist or folder is displayed on the screen of the display panel 200.

In addition, optical devices located at positions corresponding to the displayed controllable direction ($\oplus$) the optical masking sensing unit 300 are turned on such that the scrolling operation can be performed in the displayed controllable direction. In other words, light sources 310 are arranged in the form of $\oplus$ on the optical masking sensing unit 300. Here, a vertical direction ($\leftrightarrow$) is for moving between playlists to search for a song, and a horizontal direction ($\leftrightarrow$) is for searching for a folder.

Hence, by scrolling the light sources 310 arranged on the optical masking sensing unit 300, the user can move a pointer located at a playlist to a desired playlist and select the desired playlist or search for a folder.

Figure 8C:
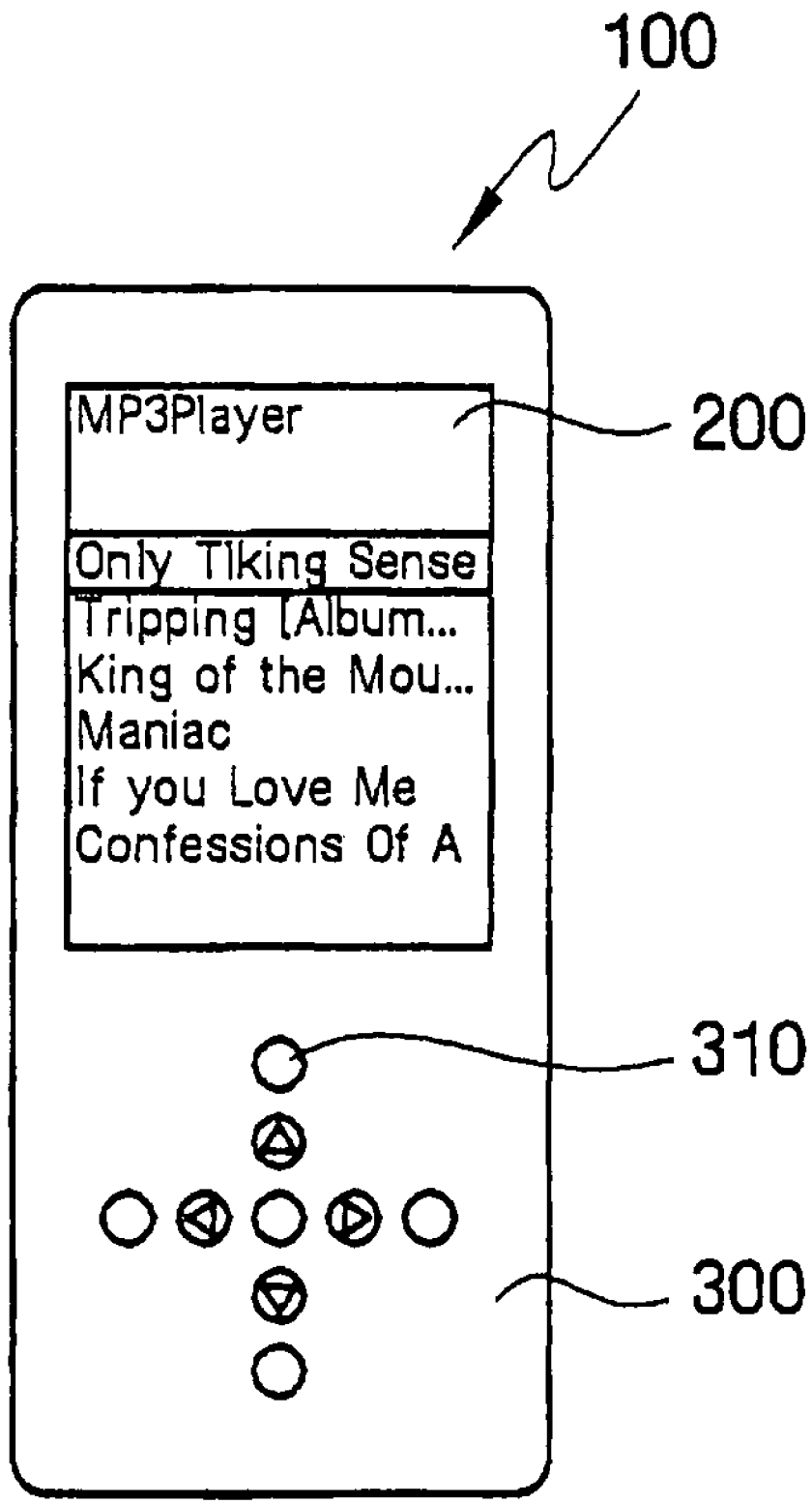

As shown in FIG. 8C, an MP3 playlist is displayed on the display panel 200. In this case, a user has to manipulate light sources 310 in an up/down/right/left direction to search for a desired playlist or folder.

Therefore, a controllable direction is displayed on the light sources 310. Accordingly, the user can intuitively perform a desired function.

Figure 8D:
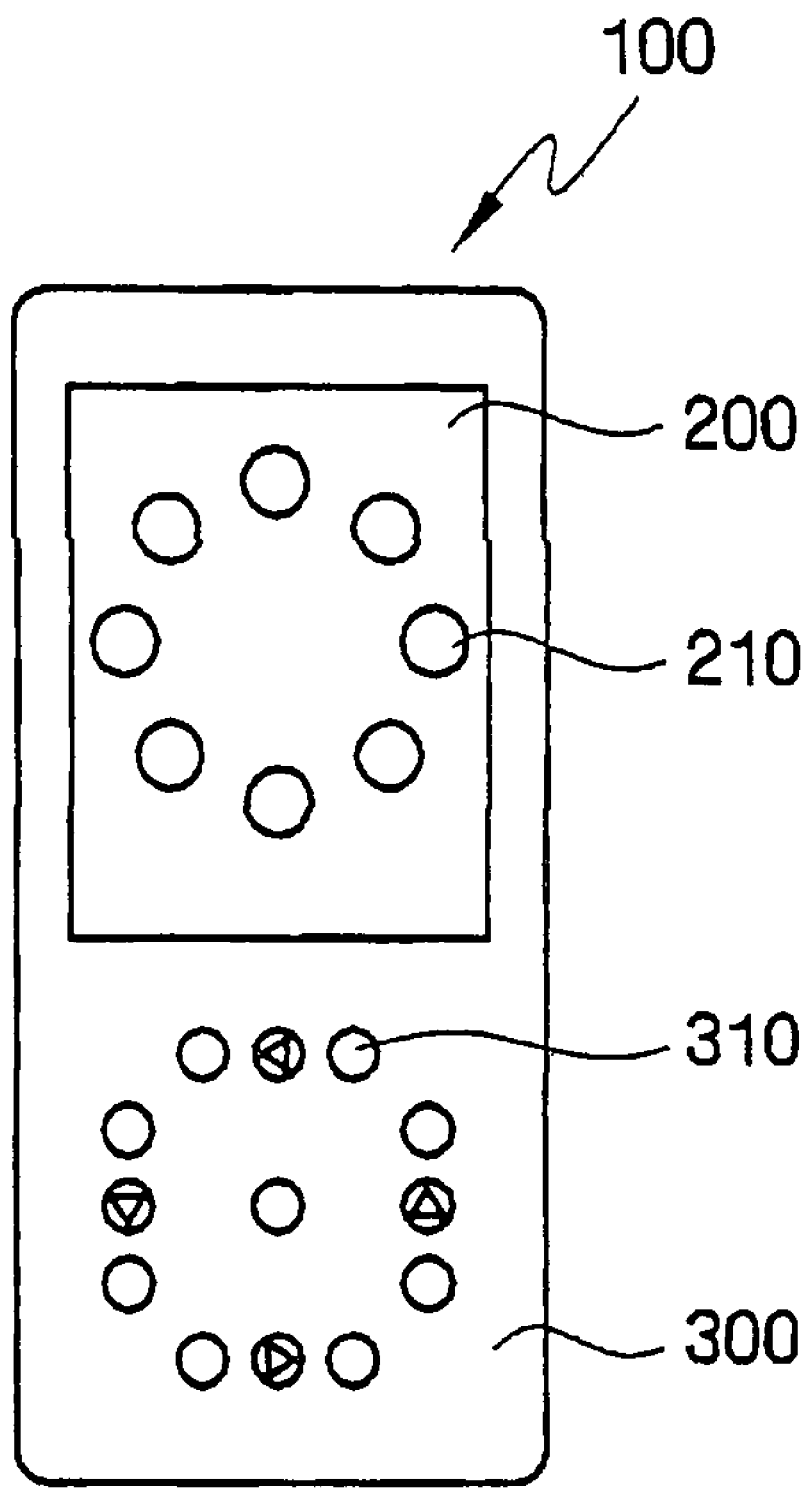

As shown in FIG. 8D, icons 210 are arranged and displayed in a circular form on the display panel 200. In this case, a user has to manipulate light sources 310 in a counter-clockwise direction to select one of the displayed icons 210.

Therefore, optical devices to be turned on among the optical devices included in the optical masking sensing unit 300 are searched for based on position values of the displayed icons 210, and the found optical devices are turned on. Accordingly, the light sources 310 emitted by the turned-on optical devices are arranged on the optical masking sensing unit 300. Then, the displayed icons 210 and the light sources 310 are mapped to corresponding positions. In addition, the controllable direction is displayed on the light sources 310.

According to an embodiment of the present invention, a user interface (UI) for showing the controllable direction displayed on the light sources 310 moving in a corresponding control direction may be provided.

As described above, an input apparatus and method using optical masking according to embodiments of the present invention provide at least one of the following advantages.

Optical devices to be turned on are searched for based on position values of icons displayed on a display panel, and the found optical devices are turned on. Accordingly, the displayed icons and light sources emitted by the optical devices are mapped to corresponding positions. Hence, a user can intuitively carry out required manipulations to operate a desired function.

According to an embodiment of the present invention, if a user selects and masks a light source, the input apparatus can sense the reflected light source. In so doing, the input apparatus can more accurately sense the light source selected by the user, thereby reducing malfunction.

In addition, since an input/output is controlled using optical devices (i.e., light sources), the costs for parts can be reduced.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An input apparatus using optical masking, the apparatus comprising: a display panel to display a first display configuration comprising a first plurality of icons at various positions on the display panel and to display a second display configuration comprising a second plurality of icons at various positions on the display panel, wherein a location of the first plurality of icons on the display panel is different from a location of the second plurality of icons on the display panel and the first display configuration is displayed at a different time than the second display configuration; and an optical masking sensing unit comprising a plurality of optical devices having light sources, wherein after the user selects the number of icons to be displayed, a corresponding number of light sources are turned on, and wherein the corresponding number of light sources are located at positions which correspond to positions of the selected number of icons currently being displayed.

2. The apparatus of claim 1, wherein when a user selects and masks a light source, the optical masking sensing unit senses the masked light source.

3. The apparatus of claim 2, wherein the light source is selected by at least one of a tap, a scroll, and a multi-input performed by the user.

4. The apparatus of claim 1, wherein a controllable direction of the displayed icons is displayed on the light sources.

5. The apparatus of claim 1, wherein the optical devices are light-emitting diodes (LEDs).

6. An input apparatus using optical masking, the apparatus comprising:
a display panel to display a plurality of icons at various positions on the display panel;
a light-emitting unit to provide optical devices having light sources on an optical masking sensing unit and to selectively turn on any optical devices whose positions correspond respectively to the various positions of the plurality of icons;
a light reception checking unit to sense when a light source of the turned on light sources has been masked by a user and to detect a position of the masked light source; and
a control unit to locate a sub-icon of an icon whose position corresponds to the detected position of the masked light source and to display the located sub-icon.

7. The apparatus of claim 6, wherein the displayed icon and the light source are mapped to corresponding positions.

8. The apparatus of claim 6, wherein the light source is selected by at least one of a tap, a scroll, and a multi-input performed by the user.

9. The apparatus of claim 6, wherein the optical devices are LEDs.

10. The apparatus of claim 6, further comprising:
a storage unit to store position information of the displayed icon and the optical device; and
a display unit to display the icon and a function of the icon selected by the user.

11. The apparatus of claim 6, further comprising an optical device management unit to detect an optical device to be turned on based on position information of the displayed sub-icon.

12. A method of controlling an input apparatus using optical masking, the method comprising:
sensing an optical device having a light source that is selected and masked by a user;

obtaining position information of the sensed light source and locating an icon corresponding to the obtained position information;

detecting optical devices corresponding to sub-icons of the located icon based on position information of the sub-icons; and displaying the sub-icons and turning on the detected optical devices whose positions correspond to the positions of the sub-icons.

13. The method of claim 12, wherein the displayed sub-icons and light sources emitted by the turned-on optical devices are mapped to corresponding positions.

14. The method of claim 12, wherein the light source selected by the user is masked and reflected, and the selection of the user is detected based on the reflected light source.

15. The method of claim 12, wherein the light source is selected by at least one of a tap, a scroll, and a multi-input performed by the user.

16. The method of claim 12, wherein a controllable direction of the displayed sub-icons is displayed on the light source.

17. The method of claim 12, wherein the optical devices are LEDs.

18. A method of controlling an input apparatus using optical masking, the method comprising:

displaying, on a display panel, a first display configuration comprising a first plurality of icons at various positions;

displaying, on the display panel, a second display configuration comprising a second plurality of icons at various positions, wherein a location of the first plurality of icons on the display panel is different from a location of the second plurality of icons on the display panel and the first display configuration is displayed at a different time than the second display configuration; and turning on one or more optical devices of a plurality of optical devicess when the one or more optical devices are located at positions corresponding to positions of any icons currently being displayed on the display panel of the input apparatus.

19. The method of claim 18, wherein when a user selects one of the emitted light sources, masking and reflecting the selected light source in an opposite direction.

20. The method of claim 19, further comprising:

sensing the light source masked and reflected as selected by the user; and searching for information regarding an icon corresponding to the position value of the reflected light source.

21. The method of claim 20, further comprising:

checking position information of sub-icons to be displayed based on information regarding the icon found; and detecting optical device to be turned on based on the checked position information of the sub-icons.

22. The method of claim 21, further comprising:

displaying the sub-icons on the display unit base on the position information of the sub-icons;

turning on the detected optical devices; and mapping the displayed sub-icons and light sources emitted by the turned-on optical devices to corresponding positions.

* * * * *

UNITED STATES PATENT AND TRADEMARK OFFICE
CERTIFICATE OF CORRECTION

| | | |
|---|---|---|
| PATENT NO. | : 8,164,580 B2 | |
| APPLICATION NO. | : 11/797758 | |
| DATED | : April 24, 2012 | |
| INVENTOR(S) | : Jung-hyun Shim et al. | |

It is certified that error appears in the above-identified patent and that said Letters Patent is hereby corrected as shown below:

Column 12, Line 6, In Claim 18, delete "devicess" and insert -- devices --, therefor.

Signed and Sealed this
Twenty-sixth Day of June, 2012

David J. Kappos
*Director of the United States Patent and Trademark Office*